Oct. 28, 1952     R. FERRARI     2,615,298

UNIVERSAL AND ORDINARY CLOCK

Filed Feb. 19, 1947

Inventor
R. Ferrari

Patented Oct. 28, 1952

2,615,298

UNITED STATES PATENT OFFICE 2,615,298

UNIVERSAL AND ORDINARY CLOCK

Ruggero Ferrari, Parma, Italy

Application February 19, 1947, Serial No. 729,490
In Italy January 31, 1946

Section 1, Public Law 690, August 8, 1946
Patent expires January 31, 1966

2 Claims. (Cl. 58—43)

The present invention relates to an ordinary clock so arranged as to cause it to indicate also the hour and the day in every part of the world.

Universal clocks are known which are either actuated by special mechanisms which are more complicated than those of the usual clocks, or are provided with indicating means different in operation from those of the clocks generally in use.

The main object of the present invention is to arrange the ordinary clock with numeration from 1 to 12 for hours and subdivided minutes and the relative hour and minute hands to indicate at the same time, instantly and continuously, also the hour and minute, as well as the day, in various parts of the world with respect to the local day and hour and minute, and to do so without modifying the original function and operation of the clock in any way. Thus, the numeration from 1 to 12 and the hour and minute hands are retained, and, as far as their operation is concerned, it is the same as normal that the average unskilled person will observe as easily as before.

Another object is to provide a clock in which the local hour is always indicated both on the twelve (12) and twenty-four (24) hour systems.

A further object is to provide a clock in which the geographical part is represented by such a planisphere or world map as to amplify the showing of the countries of the northern hemisphere.

Figure 1:
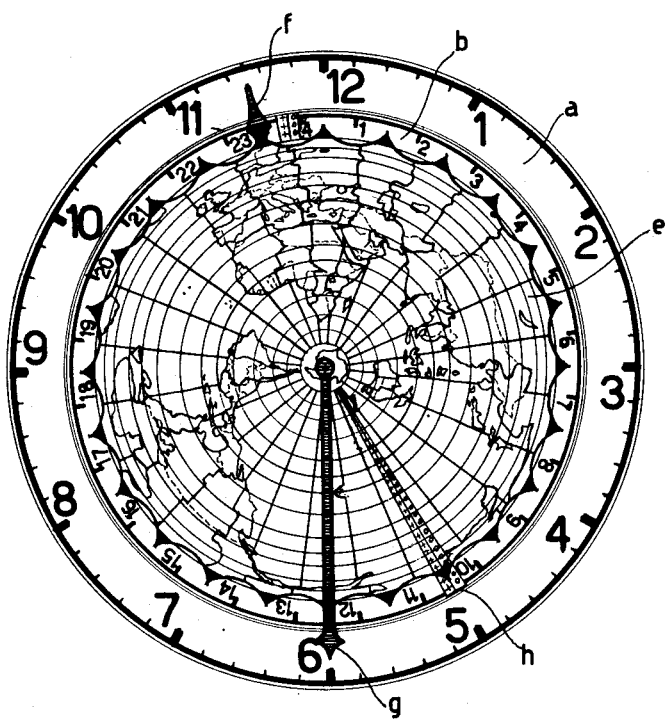
Figure 2:
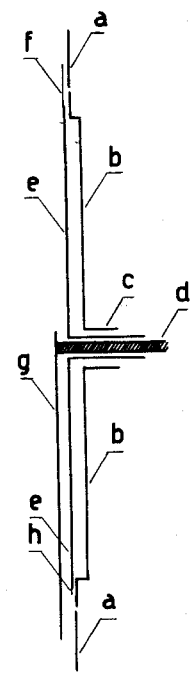

These and further objects of the invention will be more apparent from the following description, with reference to the attached drawing showing, by way of indication and not of limitation, a preferred embodiment of the invention, in which Fig. 1 is a front view; and, Fig. 2 is a diagrammatic diametral section.

In the embodiment according to the invention $a$ designates a stationary disc graduated in the usual manner from 1 to 12, and subdivided into 60 minutes as in ordinary clocks; $b$ designates a smaller disc on the periphery of which there is a clockwise graduation from 1 to 24; and $e$ designates a second still smaller disc on which a world map is represented. This world map is obtained by projecting the earth's surface on a plane tangent to the south pole, so that the latter is positioned in the center of the world map. Consequently, as the world map is rotated clockwise, the graduation proceeds from 1 to 24 clockwise as is usual and the most important regions, that is those of the northern hemisphere, on account of being at the periphery of the map, are advantageously enlarged.

The projection may be conveniently obtained from a point on the earth's axis, beyond the north pole such that the cone of the tangents from that point to the globe are at angle of at least 134°; that is to say the world map does not reproduce the earth's zones beyond 67° latitude, as these are of little interest. An opisteral polar perspective projection is therefore used. By opisteral polar perspective, as here used, is therefore meant a projection of one hemisphere of the earth, below an arbitrarily selected point, on a circle having its center at the south pole on a horizontal plane tangent to earth at the south pole, and its radius determined by a line at an angle of elevation with respect to said horizontal plane and tangent to the earth's surface at said arbitrarily selected point. Such latter line will necessarily be at an angle of elevation with respect to the horizontal plane equal to half the central angle of the arbitrarily selected point with respect to a major diameter through the equator.

The positions of the hands for the different times are indicated on the map in their real outlines and alternating colors, and in addition so are all the geographical indications which may be of interest. On the attached drawing the dotted zones indicate those countries which in 1939 did not as yet follow the standard system of twelve (12) and twenty-four (24) hour time designation. Each of the radial hour lines terminates in a point towards the respective hour to make the reading easier; the peripheral profile of the disc $e$ comprises, therefore, 24 points or indices equally spaced apart from each other on the prolongations of the 24 normal meridians. These 24 points are all equal except for the one $f$ for indicating the local hour, which is longer and more clearly indicated.

The conventional date line is also indicated on the map and prolonged with an index, and two different colors are shown on the opposite sides of said line. The same colors are indicated on the two sides of the mark corresponding to the hour 24 on the disc $b$, the color towards the hour 1 being the same as the color toward Asia on the date line and the color toward the hour 23 is the same as the color toward America on the date line. In this manner the graduation from 1 to 24, owing to the two colored mark of the hour 24 and the two colored index $h$ moving thereon, also functions as an indication instrument.

The three discs $a$, $b$ and $e$ are concentrically mounted but, while the first one, as above stated, is stationary, the other two rotate clockwise on the minute hand shaft $d$, that is, the disc $b$ performs a complete revolution in 24 hours while the disc $e$ performs two revolutions in 24 hours, in the same manner as does the usual hour hand, which it replaces. Thus the world map performs two revolutions with respect to the graduation 1-12 and a single revolution with respect to the graduation 1-24; it is possible therefore to have for the region of greatest interest, the ordinary clock and the universal clock by providing the point for indicating the local hour with the longer index $f$, as stated above. This index, after the relationship between the two graduations and the map has been fixed the assembly, thereafter always indicates the same hour on both graduations. The minute hand shaft $d$ performs one revolution in one hour and carries the usual hand $g$. These elements are operated in the following way: the hand $g$ with its shaft $d$ and the disc $e$ are rotated respectively in the same manner as the minute and hour hands of a conventional clock; and the disc $b$ is rotated through the sleeve $c$ by means of any suitable gearing, this, however, not being illustrated as it is well known to those skilled in the art. As is readily apparent, the invention requires no substantial modification of the ordinary clock mechanism, and it is possible to readily reconstruct the ordinary clocks to embody same.

From what has been hereinbefore described the indications given by the universal and ordinary clock according to the invention are evident.

The local hour is indicated by the index $f$ on both sets of graduations which are divided respectively into 12 and 24 parts, while the minutes are indicated by the hand $g$, the same as in ordinary clocks. Each of the points or indices corresponding to the radial hour lines indicates the hour of the respective local hour on the set of graduations 1-24. The minutes are indicated by the usual hand $g$. The two segments of the map (or more exactly the two segments comprised by the radial hour lines) defined by the sides of the same color on the disc $b$ and index $h$ indicate the two days existing on the earth, the local day being known. Moreover said two segments of the world map show, by their change of color, when the index $h$ passes beyond the two colored mark for the hour 24, how each day takes 24 hours to transpire on the entire globe and another 24 hours to disappear therefrom. The day of each region of the world is thus known and can be followed during its evolution.

The choice of the world map with the south pole in the center affords also the following advantage: when the universal and ordinary clock is calibrated, if the index for the hour of the place in which the observer is located is directed towards the sun, the reference clock center hour 24 indicates without need of calculations, with a sufficient approximation, the North in the northern hemisphere. For this reason an "N" is indicated near the hour mark 24.

Having now particularly described and ascertained the nature of my said invention and in what manner the same is to be performed, I declare that what I claim is:

1. A clock dial assembly comprised by a flat circular rim having twelve hour graduations thereon, a minute hand movable thereover and arranged to make one revolution each hour, a disc within said flat circular rim arranged to make one revolution every twenty-four hours and having twenty-four hour graduations thereon, a second disc arranged to make one revolution each twelve hours and positioned in front of the first disc and beneath the minute hand, said second disc having a map of the northern hemisphere in planisphere thereon divided into twenty-four sectors, and an indicator on the second disc adapted to register with both the twelve hour graduations on the flat circular rim and the twenty-four hour graduations on the first disc for indicating the local hour.

2. A clock dial assembly comprised by a flat circular rim having twelve hour graduations thereon, a minute hand movable thereover and arranged to make one revolution each hour, a disc within said flat circular rim arranged to make one revolution every twenty-four hours and having twenty-four hour graduations thereon and an index formed by lines of different colors on the opposite sides of the twenty-four hour marks, a second disc arranged to make one revolution each twelve hours and positioned in front of the first disc and beneath the minute hand, said second disc having a map of the northern hemisphere in planisphere thereon divided into twenty-four sectors with the international date line marked between the twenty-fourth and first sectors, and a cooperating index formed by lines of different colors on the opposite sides of the international date line, whereby the relative positions of the indices indicate the phase of the day in various sections of the northern hemisphere, and an indicator on the second disc adapted to register with both the twelve hour graduations on the flat circular rim and the twenty-four hour graduations on the first disc for indicating the local hour.

RUGGERO FERRARI.

REFERENCES CITED

The following references are of record in the file of this patent:

UNITED STATES PATENTS

| Number | Name | Date |
|---|---|---|
| 594,410 | Margolis | Nov. 30, 1897 |
| 614,937 | Dietz | Nov. 29, 1898 |
| 641,540 | Pheils | Jan. 16, 1900 |
| 718,579 | Pheils | Jan. 13, 1903 |
| 2,056,089 | Boggs | Sept. 29, 1936 |
| 2,128,970 | Smyser et al. | Sept. 6, 1938 |

FOREIGN PATENTS

| Number | Country | Date |
|---|---|---|
| 8,070 | Great Britain | of 1909 |
| 443,953 | Great Britain | Mar. 9, 1936 |